Patented May 6, 1924.

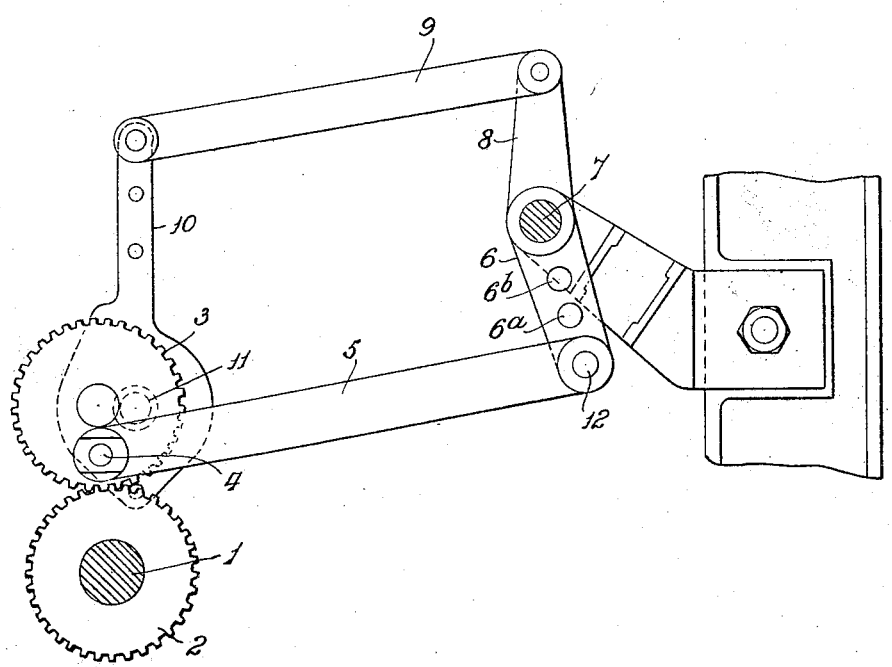

1,493,202

UNITED STATES PATENT OFFICE.

JAMES HORRIDGE, OF BOLTON, ENGLAND, ASSIGNOR TO JOHN HETHERINGTON AND SONS LIMITED, OF MANCHESTER, ENGLAND.

MACHINE FOR COMBING COTTON, WOOL, AND THE LIKE.

Application filed May 5, 1923. Serial No. 636,819.

*To all whom it may concern:*

Be it known that I, JAMES HORRIDGE, a subject of the King of Great Britain, residing at Bolton, in the county of Lancaster, England, have invented new and useful Improvements in or Relating to Machines for Combing Cotton, Wool, and the like, of which the following is a specification.

The invention relates to improvements in machines for combing cotton, wool and the like and has for its object to provide improved means for driving the feed roller of a combing machine in such manner that the feed may be regulated at will.

For this purpose the mechanism illustrated in the accompanying drawings is employed and is hereinafter fully described with reference thereto.

Referring to said drawing—1 represents the cylinder shaft upon which is mounted a pinion 2 which drives a pinion 3 which possesses a number of teeth equal to that of the pinion 2 and upon the face of the pinion 3 is fixed a crank pin 4 to which is pivotally connected one end of a link 5, which link is connected at its opposite end to an arm or lever 6 mounted upon a shaft 7 which extends the whole length of the machine and to which a rocking motion is imparted by the pinion 3 through the crank pin 4, link 5 and arm or lever 6 while also mounted upon the shaft 7 is an arm or lever 8 to the end of which is pivotally connected one end of a link 9 the other end of which is connected to the feed lever 10 which receives an oscillating motion from the shaft 7 through the arm 8, and link 9 and imparts an intermittent motion to the feed roller 11 through the usual ratchet and pawl mechanism (not shown).

The position of the pinion 3 with relation to the pinion 2 may be altered by disengaging the former from the latter and shifting the pinion 3 to an advanced or retarded position in order to secure an early or late feeding, while the stud 12 which connects the link 5 with the arm or lever 6 may be shifted to either of the holes $6^a$ or $6^b$ in order to give a greater feed per stroke.

It will be understood that the details of construction of the device may be modified without departing from the principle of the invention.

What I claim as my invention and desire to secure by Letters Patent is:—

1. In a machine for combing cotton, wool and the like means for imparting to the feed roller the usual intermittent motion comprising a pinion mounted upon the cylinder shaft, a pinion mounted above said pinion and gearing therewith, a pin upon the face of said latter pinion, a rocking shaft carried in brackets from the frame of the machine, an arm carried by said shaft, a link connecting the pin of the pinion with said arm, a second arm upon said rocking shaft, a link connecting said latter arm with the arm of the ratchet mechanism of the feed roller, and means for adjusting the time and amount of angular movement of said rocking shaft.

2. In a combing machine, the combination of a rotatable cylinder shaft, a feed roller, a rock-shaft supported in bearings carried by the frame of the machine, a pair of arms carried by said rock shaft, rotatable means geared to said cylinder shaft for rotation thereby, means for imparting intermittent motion to said feed roller and connected to one of said arms, and connecting means between the other of said arms and said rotatable means whereby the lever is rocked on its pivot during the rotation of said rotatable means.

In testimony whereof I have signed my name to this specification.

JAMES HORRIDGE.